United States Patent [19]
Ondrus

[11] Patent Number: 5,746,239
[45] Date of Patent: May 5, 1998

[54] DUAL TRACE VALVE SYSTEM

[75] Inventor: Mark Ondrus, Toledo, Ohio

[73] Assignee: Hunt-Wesson, Inc., Fullerton, Calif.

[21] Appl. No.: 531,187

[22] Filed: Sep. 19, 1995

[51] Int. Cl.$^6$ .................. B08B 3/04; B08B 9/06; F16K 51/00
[52] U.S. Cl. .................. 137/15; 134/104.1; 137/240; 137/241; 137/340
[58] Field of Search .................. 137/238, 240, 137/241, 15, 334, 340; 134/104.1; 222/148

[56] References Cited

U.S. PATENT DOCUMENTS

| | | | |
|---|---|---|---|
| 2,682,277 | 6/1954 | Marshall et al. | 137/334 |
| 2,930,170 | 3/1960 | Holsman et al. | 53/268 |
| 3,633,607 | 1/1972 | Werra | 137/241 |
| 3,643,679 | 2/1972 | Hansson | 137/241 |
| 3,744,512 | 7/1973 | Billman | 137/238 |
| 3,870,066 | 3/1975 | Jurasek | 137/241 |
| 4,325,401 | 4/1982 | Ukai et al. | 137/240 |
| 4,402,337 | 9/1983 | Schurman | 137/340 |
| 4,535,801 | 8/1985 | Neale | 137/334 |
| 4,570,665 | 2/1986 | Zimmerly | 137/240 |
| 4,623,516 | 11/1986 | Weiler et al. | 137/241 |
| 4,653,526 | 3/1987 | Hoiss | 137/241 |
| 4,699,297 | 10/1987 | Raque et al. | 222/148 |
| 4,836,236 | 6/1989 | Ladisch | 137/241 |
| 4,979,527 | 12/1990 | Mueller et al. | 137/240 |
| 4,989,649 | 2/1991 | Weiler et al. | 137/241 |
| 5,058,619 | 10/1991 | Zheng | 137/241 |
| 5,152,500 | 10/1992 | Hoobyar et al. | 137/240 |
| 5,193,571 | 3/1993 | Levati | 137/241 |
| 5,287,913 | 2/1994 | Dunning et al. | 134/340 |
| 5,296,197 | 3/1994 | Newberg et al. | 137/240 |
| 5,549,134 | 8/1996 | Browne et al. | 137/241 |

FOREIGN PATENT DOCUMENTS

| | | | |
|---|---|---|---|
| 42 13 738 A1 | 10/1993 | Germany. | |
| 400065 | 12/1913 | Sweden | 137/238 |

Primary Examiner—George L. Walton
Attorney, Agent, or Firm—Pretty, Schroeder & Poplawski

[57] ABSTRACT

A valve system includes a valve and apparatus for supplying fluids to the valve. The valve includes a valve enclosure and a valve stem movable through the valve enclosure. The valve enclosure includes a valve body and a valve bonnet. The valve system includes a first fluid supply to supply fluid to the region of the valve stem that moves through the valve enclosure, and second and third fluid supplies to supply fluid to a region of contact between the valve body and valve bonnet.

57 Claims, 4 Drawing Sheets

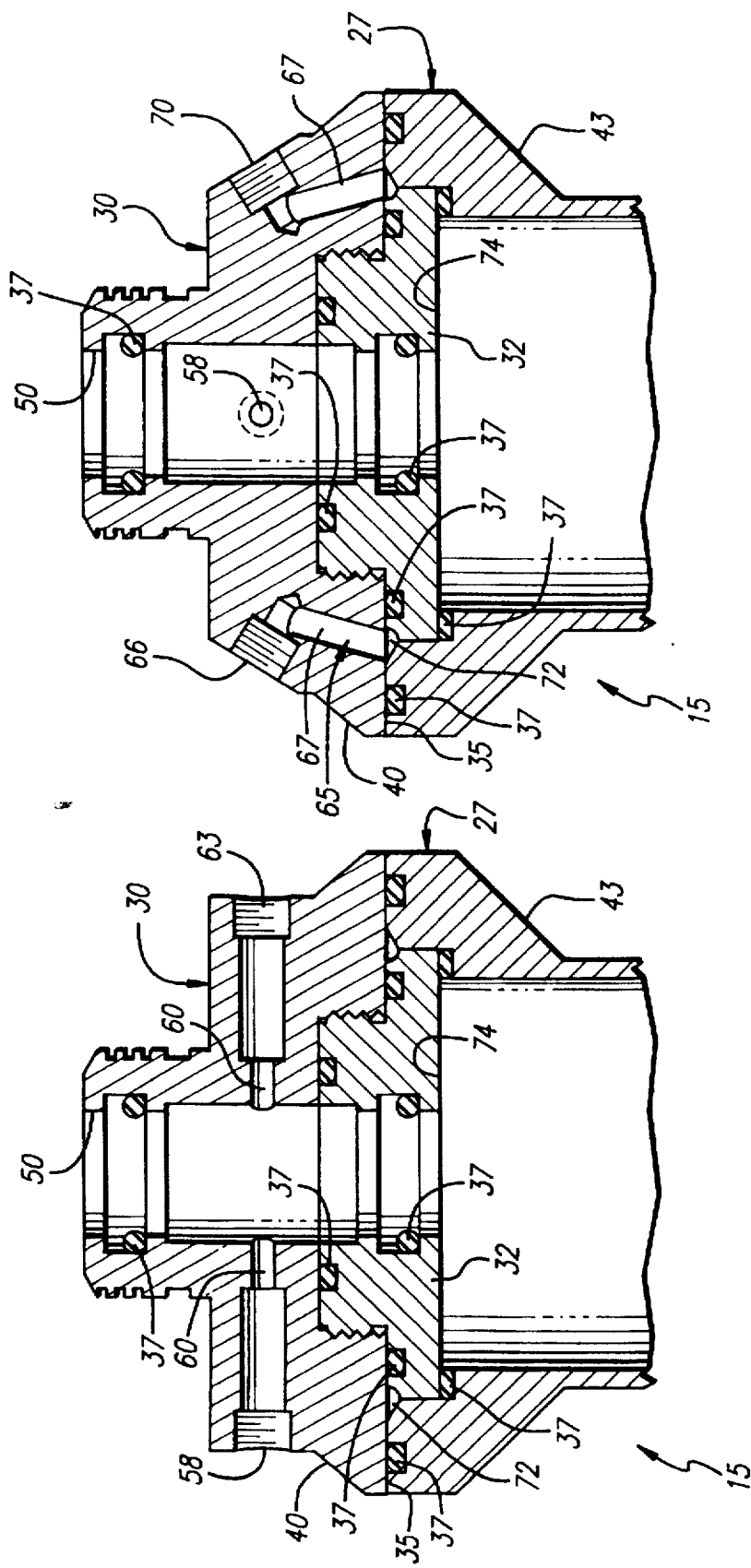

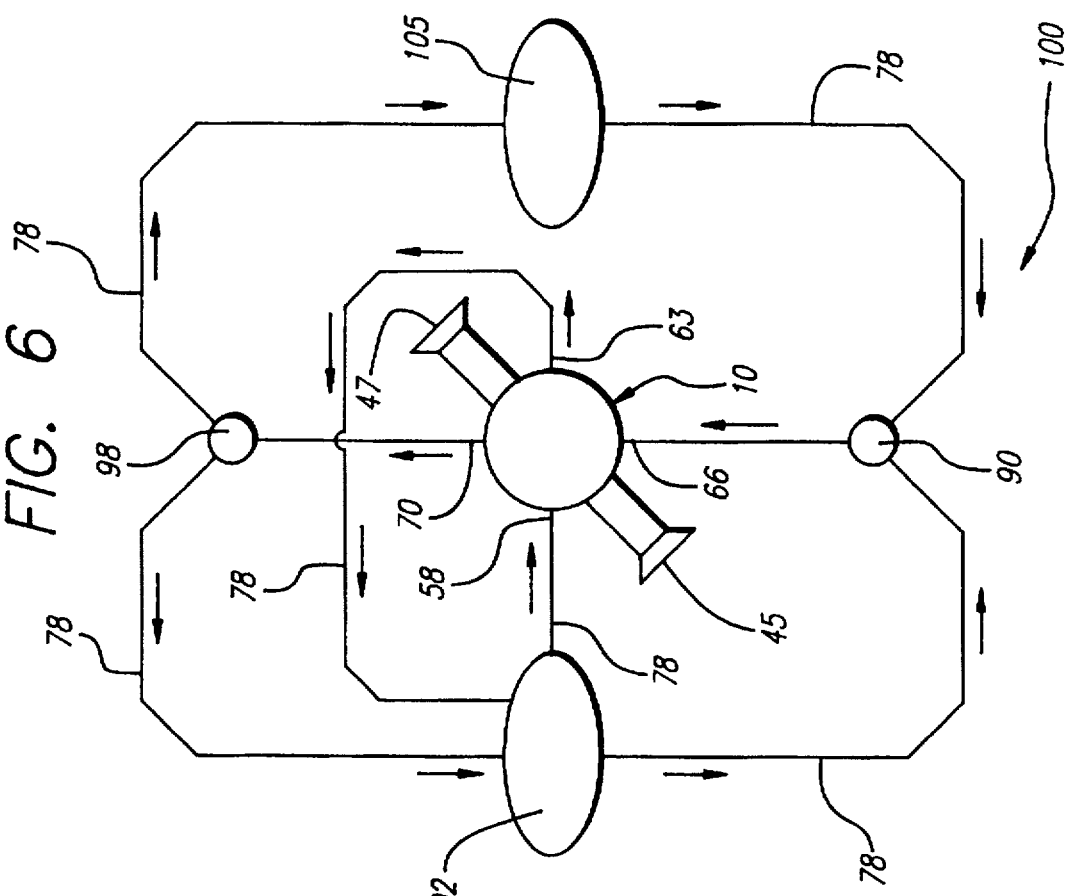
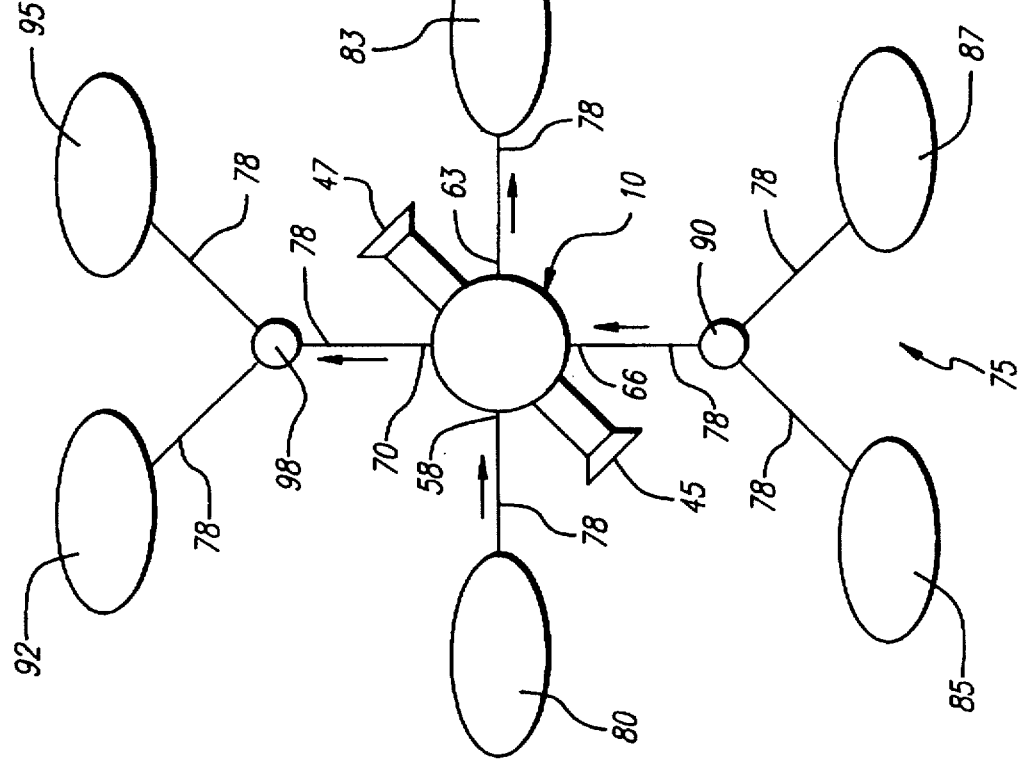

DUAL TRACE VALVE SYSTEM

BACKGROUND OF THE INVENTION

The invention relates generally to apparatus and methods for conveying a sterile material in a liquid or semi-liquid state through conduits. More particularly, the invention provides a valve system and associated methods for controlling the flow of a food product through a piping system in a food processing plant.

It is commonly required in the processing of a food product in a liquid or semi-liquid state to control the flow of the food product through a piping system in the food processing plant. Special valves are typically used to control the flow of the product through the piping system.

These valves must meet certain requirements. The valves must, of course, be capable of handling the internal pressures and flow rates found in the piping system, and of reliably controlling the product's flow through the system. Furthermore, with food products it is critical that sterility of the product is ensured, i.e., the valves must prevent the entry of bacteria and other contaminants from the environment into the piping system. Additionally, the valves should be highly resistant to leaks so that the food product is not leaked out of the system and into the plant. Finally, the valves should be of simple, robust construction, and should permit quick and convenient, disassembly, cleaning, and reassembly.

Valves have been devised previously in attempts to provide these features. In one previous type of valve, a valve body defines first and second conduits through which the food product flows. The flow of product between the first and second conduits is either prevented or permitted depending upon the position of a mechanically driven valve stem that passes through the exterior of the valve body.

Existing valves of this general type are less than ideal, however. The passage of the valve stem into the interior of the valve body provides a potential pathway through which bacteria and other foreign materials may enter the valve and contaminate the food product. To prevent this, valves of this type commonly attempt to seal the region between the valve stem and the valve body with tight-fitting rubber O-rings or similar seals. However, the tight fit of these seals around the valve stem significantly increases the power required to drive the valve between its open and closed positions. Moreover, mechanical seals are subject to wear. Perhaps most importantly, mechanical seals provide little or no resistance to the entry of bacteria. This problem is especially acute, because the reciprocating motion of the valve stem causes a portion of the stem to move between the interior and exterior of the valve.

Additionally, valves of this type require frequent disassembly for maintenance and cleaning. To facilitate this, these valves frequently include two parts, a valve body and a valve bonnet, which clamps over the top of the valve body. To disassemble the valve, one simply unclamps the valve bonnet from the valve body and the two parts of the valve are easily separated. While this does allow for convenient access to the interior of the valve, the interface between the valve body and the valve bonnet provides an additional pathway for the entry of bacteria and other contaminants into the interior of the valve. Moreover, under high pressure conditions, the food product itself may be forced through this pathway and onto the exterior of the valve.

To overcome these disadvantages, valve systems have been devised in which high temperature steam is conducted: (a) into the region of the valve stem that moves between the interior and exterior of the valve; and (b) the region of contact between the valve bonnet and valve body. This type of system is still less than ideal, however, because the high temperature steam may cause the food product to burn and stick onto the interior surfaces of the valve. This can result in difficult operation of the valve, and valves of this type require frequent disassembly for cleaning and removal of the burned on food products.

A need exists, therefore, for a valve system and related methods that provide the desirable features described above and which avoid the various deficiencies of previously known valve systems. In particular, a need exists for a new valve system in which apparatus and methods are provided for inhibiting any tendency of the food product to burn and stick onto the interior surfaces of the valve. The resulting system should, nevertheless, allow convenient disassembly of the valve for inspection and cleaning.

SUMMARY OF THE INVENTION

The invention is embodied in apparatus and methods for controlling the flow of liquid and semi-liquid food products. A valve system embodying the invention includes a valve for controlling the flow of the product and apparatus for supplying fluids to regions within the valve. The valve includes a valve enclosure and a valve stem that has a region movable through the valve enclosure. In preferred embodiments, the valve enclosure includes a valve body and a valve bonnet. The valve bonnet defines a first trace for supplying fluid to at least a portion of the region of the valve stem that moves through the valve enclosure. Also, in some preferred embodiments, a valve insert is disposed inside the valve enclosure and located to form a seal between the valve bonnet and the valve body. The valve insert, valve bonnet, and valve body are situated so that an annular interior passageway defining a second trace is formed between them for supplying fluid to the region of contact between the valve bonnet and valve body.

The related apparatus includes a first fluid supply configured to supply fluid through the first trace to at least a portion of the region of the valve stem that moves through the valve enclosure, a second fluid supply configured to supply fluid through the second trace to a region of contact between two constituent elements of the valve enclosure, and a third fluid supply also configured to supply fluid through the second trace to the region of contact between the constituent elements of the valve enclosure. In preferred embodiments, the first and second fluid supplies supply a sterilizing fluid, while the third fluid supply supplies a non-sterilizing fluid.

Before the valve is put into use, sterilizing fluids are conducted from the first and second fluid supplies into the interior of the valve. A preferred sterilizing fluid is high temperature steam of sufficient temperature to sterilize the regions of the valve that are exposed to the sterilizing fluids.

Before flow of the food product through the valve begins, flow of sterilizing fluid from the second fluid supply to the region of contact between the constituent elements of the valve enclosure is halted. Then, a non-sterilizing fluid is conducted under pressure from the third fluid supply to that region of the valve. A preferred non-sterilizing fluid is chilled air having a temperature of about 40° F., conducted under positive pressure to reduce the temperature of the region of contact between the constituent elements of the valve enclosure, which has been sterilized by high temperature steam. An early prototype system has used chilled sterile water having a temperature of about 60° F. as a non-sterilizing fluid.

Consequently, before flow of the food product begins, the region of contact between the constituent elements of the valve enclosure is sterilized by the sterilizing fluid. Thereafter, the chilled non-sterilizing fluid inhibits any tendency of the food product to burn and stick onto the interior surfaces of the valve enclosure while inhibiting the migration of the food product or contaminants between the interior and exterior of the valve. In preferred embodiments, burning and sticking of the food product onto the interior surfaces of the valve enclosure is further inhibited by forming the valve insert of a non-stick material. And once flow of the food product begins, the continuous supply of the sterilizing fluid from the first fluid supply to the region of the valve stem that moves through the valve enclosure ensures sterility of that region and prevents contamination of the food product.

Other features and advantages of the present invention will become apparent from the following detailed description of the preferred embodiment, taken in conjunction with the accompanying drawings, which illustrate by way of example the principles of the invention.

BRIEF DESCRIPTION OF THE DRAWINGS

FIG. 3A is a side sectional view of the valve enclosure taken through section lines A—A of FIG. 2;

FIG. 3B is a side sectional view of the valve enclosure taken through section lines B—B of FIG. 2;

FIG. 5 is a schematic diagram of one embodiment of a valve system according to the invention; and FIG. 6 is a schematic diagram of an alternate embodiment of a valve system according to the invention.

DESCRIPTION OF THE PREFERRED EMBODIMENTS

Figure 1:
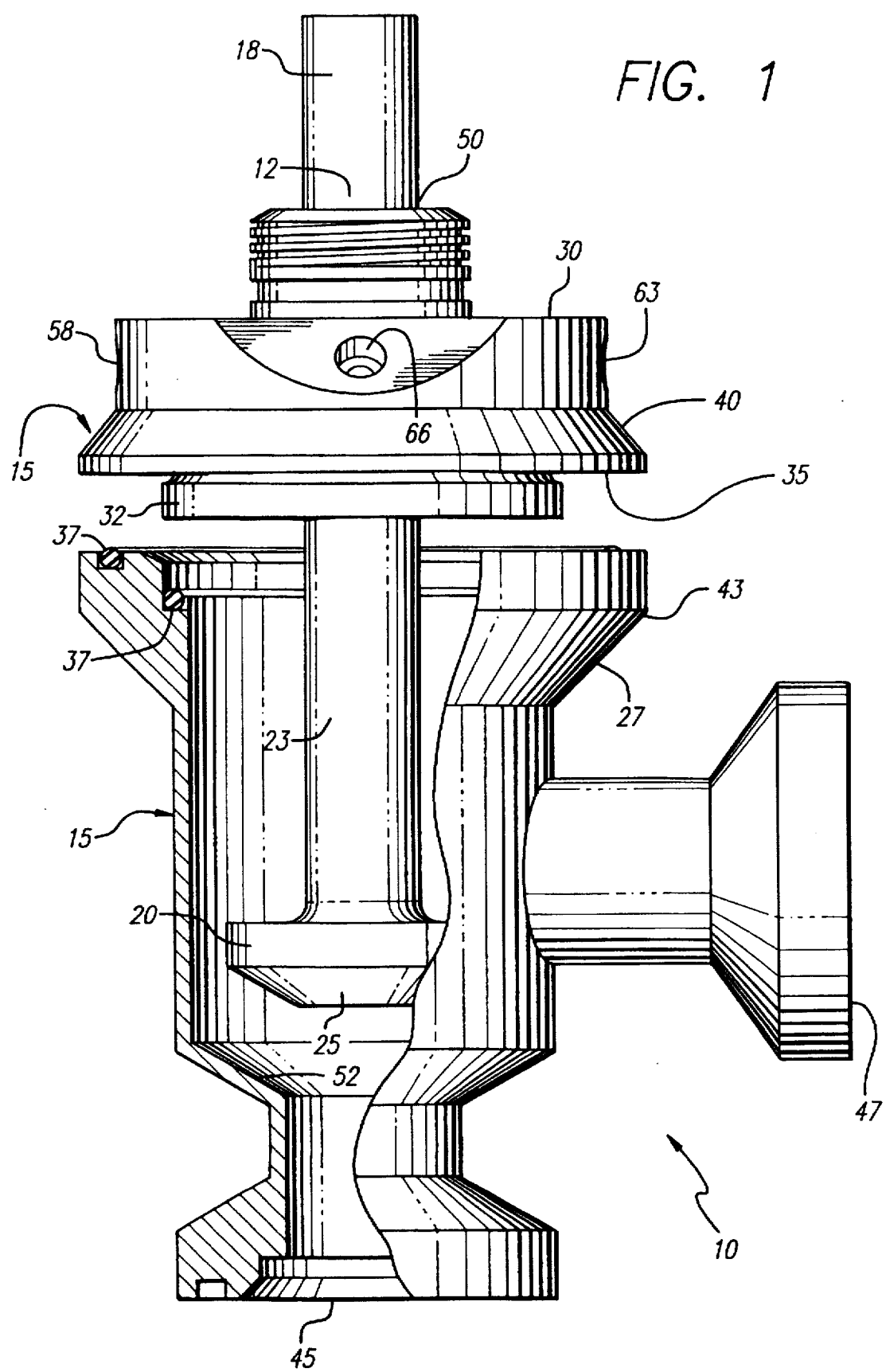
FIG. 1 is a partially exploded side view of a valve for use in a valve system according to the invention in which a portion is cut away to show some of the interior parts of the valve.

FIG. 1 depicts, in a partially exploded view, the constituent parts of a valve for use in a valve system according to the invention. As depicted therein, the valve 10 includes a valve stem 12, one end of which is movably disposed inside of a two-piece valve enclosure 15. The valve stem is operably connected at its upper end 18 to a mechanical actuator (not shown), which moves the valve stem inside the valve enclosure. A valve member 20 is fixed to the valve stem at its lower end 23. The valve member includes a sealing edge 25 around its periphery.

The valve enclosure 15 is constructed of two constituent elements—a valve body 27 and a valve bonnet 30. In FIG. 1, the valve body is shown partially cut away to reveal a portion of the valve body's interior and the valve stem 12. A valve insert 32 screws into the bottom side 35 of the valve bonnet. When the valve 10 is assembled, the valve bonnet and valve insert are fitted and clamped against the valve body so that a seal is formed between the valve body and the valve bonnet; another seal is formed between the valve body and the valve insert. O-rings and similar seals 37 provide seals at the regions of contact between these parts. A ring clamp (not shown) fits over the valve bonnet and valve body. The ring clamp bears against a shoulder 40 of the valve bonnet and a corresponding shoulder 43 of the valve body. After the valve is assembled, the ring clamp is tightened to hold these parts securely together.

The valve body 27 defines a first product conduit 45 and a second product conduit 47. The valve stem 12 slides through a central bore 50 in the valve bonnet 30 and the valve insert 32 so that the valve member 20 is movable inside the valve body. The valve stem is movable between a closed position in which the sealing edge 25 of the valve member bears against a valve seat 52 on the valve body, and an open position (as shown) in which the sealing edge is held away from the valve seat. In the closed position, the valve member prevents fluid communication between the first and second product conduits; in the open position, fluid communication is permitted.

Figure 2:
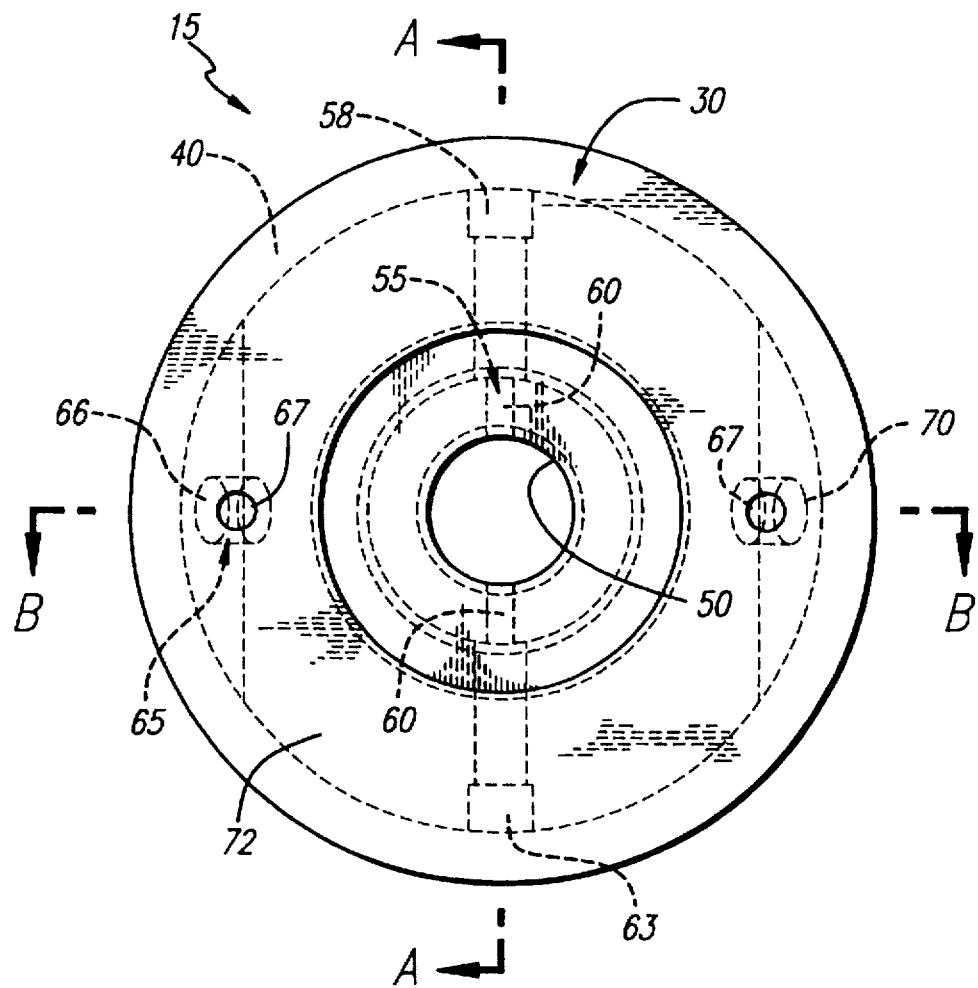
FIG. 2 is a top view of a valve enclosure for use with the valve system of FIG. 1.

FIG. 2 shows the top of the valve enclosure 15. A sectional view of FIG. 3A is taken through section lines A—A of FIG. 2, and another sectional view of FIG. 3B is taken through section lines B—B. The parts of the valve enclosure 15 define a pair of "traces," or passageways, through which sterilizing fluids pass to ensure the sterility of regions of the valve that might otherwise be contaminated. Referring especially to FIG. 3A, a first trace 55 comprises a first inlet 58, first interior passageways 60, and a first outlet 63. As depicted therein, the first inlet and first outlet are in fluid communication with the central bore 50 through the first interior passageways. As noted above, a plurality of O-rings or gaskets 37 having appropriate cross-sections and sizes seal various parts of the valve where they come together.

Referring now especially to FIG. 3B, a second trace 65 comprises a second inlet 66, second interior passageways 67, and a second outlet 70. The second inlet and second outlet are in fluid communication with the bottom side 35 of the valve bonnet 30 through the second interior passageways. The second trace leads from the exterior of the valve bonnet through the second interior passageways and into an annular interior passageway 72, which is formed at the common junction of the valve body 27, valve bonnet 30, and valve insert 32. The annular interior passageway encircles the valve insert, thereby placing the second inlet in fluid communication with the second outlet.

Figure 4:
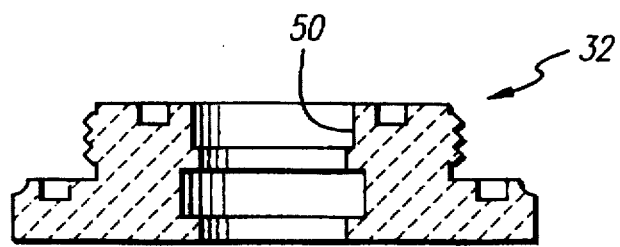
FIG. 4 is a side sectional view of an insert for use in the valve depicted in FIG. 1.

The valve insert 32 is depicted in a side sectional view in FIG. 4. The valve insert is preferably formed of a non-stick material. The non-stick material will typically be a nonmetallic material formulated to inhibit sticking or burning of the food product onto the exposed surface of the valve insert. Suitable non-stick materials include fluorinated hydrocarbons such as the material sold by E. I. du Pont de Nemours & Co. under the trade name TEFLON™. In a preferred embodiment, the valve insert is formed of a material known as "fluorosint," a mixture comprising TEFLON™ embedded with mica. As shown in FIGS. 3A and 3B, the valve insert is disposed so that the non-stick material defines a surface 74 presented to the interior of the valve enclosure 15. It is a distinct advantage of valve systems in accordance with the invention that this surface effectively decreases any tendency of the food product to stick in the region of the valve insert.

When the valve 10 is assembled and ready for use, the valve is connected into a fluid supply and withdrawal system 75, which is depicted schematically in FIG. 5. The fluid supply and withdrawal system includes a number of conduits 78, which couple the various elements of the system to one another. As shown in FIG. 5, the first inlet 58 of the first trace is coupled to a first fluid supply 80. On the opposite side of the valve, the first outlet 63 is coupled to a first fluid reservoir 83. A first fluid can be conducted under pressure from the first fluid supply into the valve, through the first trace, and out of the valve into the first fluid reservoir.

The second inlet 66 of the second trace is selectively coupled to a second fluid supply 85 and a third fluid supply 87 through a fluid inlet control valve 90. From the fluid inlet control valve, a fluid from either the second fluid supply or the third fluid supply can be conducted under pressure into the second fluid inlet, through the second trace and the annular interior passageway 72 (see FIG. 3B), and out of the valve 10 through the second outlet 70. From the second outlet, the fluid is conducted either into a second fluid reservoir 92 or a third fluid reservoir 95, depending on the setting of a fluid outlet control valve 98.

Referring back to FIG. 1, the valve 10 is used to control flow of a liquid or semi-liquid food product between the first product conduit 45 and the second product conduit 47 depending on the position of the valve member 20 and the valve stem 12, which is in turn controlled by a mechanical actuator (not shown). Before the flow of food product begins, a sterilizing fluid is conducted out of the first fluid supply 80 (see FIG. 5) and around the valve stem within the central bore 50 in the region of the first trace 55 (see FIG. 3A). At the same time, a sterilizing fluid is conducted out of the second fluid supply 85 (see FIG. 5) and through the annular interior passageway 72 around the valve insert 32 (see FIG. 3B). The fluid from the first fluid supply is then conducted out of the valve and into the first fluid reservoir 83 (see FIG. 5); the fluid from the second fluid supply is conducted into the second fluid reservoir 92. The sterilizing fluid conducted through the first trace 55 sterilizes the region of the valve stem in the central bore 50 (see FIG. 3A). The sterilizing fluid conducted through the second trace 65 sterilizes the region of the annular interior passageway 72 at the junction of the valve body 27, valve bonnet 30, and valve insert 32 (see FIG. 3B).

The fluids from the first and second fluid supplies have been described as "sterilizing fluids." A sterilizing fluid is any fluid capable of killing microorganisms, especially bacteria, that might be present in the regions of the first and second valve traces. A preferred sterilizing fluid is steam of a sufficiently high temperature to kill microorganisms by heat. A sterilizing fluid that kills microorganisms by chemical action could also be used as an alternative.

The sterilizing fluid is preferably conducted continuously through the first trace while the valve is in use. This causes continuous sterilization in the region of the first trace 55 as the valve stem moves in and out of the valve bonnet 30 through the central bore 50. Referring now to FIG. 3B, sterilizing fluid could also be conducted continuously through the second trace 65 while the valve is in use. This could be problematic however. Because the preferred sterilizing fluid is high temperature steam, continuous flow of sterilizing fluid through the second trace could contribute to the tendency of the food product to overheat, burn, and stick onto the surfaces of the valve insert 32 or the valve body 27.

To inhibit this tendency, the sterilizing fluid is conducted through the second trace for a time sufficient to ensure sterility in the region of the trace. Before the valve 10 is put into use, the fluid inlet control valve 90 (see FIG. 5) is switched so that fluid from the third fluid supply 87 is conducted through the second trace. From there, the fluid is conducted out of the valve, through the fluid outlet control valve 98, and into a third fluid reservoir 95. To inhibit the tendency of the product to burn onto the interior surfaces of the valve, the fluid from the third fluid supply is preferably a chilled fluid, i.e., a fluid having a temperature substantially less than the steam or other sterilizing fluid conducted through the first trace. The chilled fluid will most commonly have a temperature above about 32° F. to avoid any possibility of water in the food product freezing inside the valve. The fluid from the third fluid supply is most preferably pressurized air at approximately 40° F. An alternate fluid from the third fluid supply is chilled sterile water at approximately 60° F.

Most preferably, chilled air will be conducted through the second trace at a positive pressure well above ambient. This will tend to inhibit any seepage of food product out of the valve through the space between the valve bonnet and the valve body. Positive air pressure in the second trace will also inhibit the migration of bacteria and other microorganisms from the exterior into the interior of the valve.

It should be appreciated that modifications may be made to the fluid supply and withdrawal system 75 depicted in the schematic diagram of FIG. 5. For example, systems in accordance with the invention will usually be provided for recycling the fluids out of the fluid reservoirs and back into the fluid supplies. Also, in a preferred embodiment the fluids delivered from the first and second fluid supplies are the same fluid, i.e., high temperature steam. Therefore, much of the apparatus associated with the first and second fluid supplies may be shared between the two supplies. For example, storage, piping, reheating, and recirculating apparatus may be common to and shared by both of these fluid supplies, with separate conduits connected to the first and second inlets and to the first and second outlets.

An alternative fluid supply and withdrawal system 100 is depicted schematically in FIG. 6. The system of FIG. 6 is preferable in several respects to that shown in FIG. 5. In this system, a common primary fluid supply 102 is coupled by conduits 78 to supply fluid to both the first inlet 58 and the second inlet 66. The primary fluid supply is also coupled to receive fluid from both the first outlet 63 and the second outlet 70. The primary fluid supply will usually supply high temperature steam or another suitable sterilizing fluid, as described above in connection with FIG. 5.

In the alternative fluid supply and withdrawal system 100 shown in FIG. 6, the second inlet 66 is connected to receive a fluid from a secondary fluid supply 105. After this fluid passes through the second trace, it flows out of the second outlet 70 and back into the secondary fluid supply. The secondary fluid supply will generally supply pressurized chilled air or a similar fluid that will substantially eliminate the burning of the food product onto the interior surfaces of the valve. Flow of fluid between the valve 10 and either the primary fluid supply 102 or secondary fluid supply 105 is controlled, as described above, by a fluid inlet control valve 90 and a fluid outlet control valve 98.

An alternative fluid supply and withdrawal system 100 will also typically include additional apparatus configured, for example, to filter, reheat, repressurize, or rechill the respective fluids before those fluids are recycled back through the valve 10. For clarity, this additional apparatus is omitted from the simplified schematic diagram of FIG. 6.

FIGS. 5 and 6 show fluid supply and withdrawal systems that include "supplies" and "reservoirs" for supplying and receiving fluids conducted through the valve. FIGS. 5 and 6 are schematic depictions in which the supplies and reservoirs are indicated by generally ovoid symbols. This should not imply any particular shape, volume, or configuration for these elements. The supplies and reservoirs are intended to include any suitable apparatus for supplying and receiving appropriate fluids to and from the valve.

A particular embodiment of the invention has been described above in considerable detail for the purpose of illustrating its principals and operation. However, various modifications may be made, and the scope of the invention is not limited to the exemplary embodiment described above. The scope of the invention should therefore be determined primarily by reference to the appended claims, along with the full scope of equivalents to which those claims are legally entitled.

What is claimed is:

1. A valve system comprising:

a valve enclosure defining an interior and comprising multiple constituent elements having a region of contact between them;

a valve stem including a region movable through the valve enclosure;

a first supply of sterilizing fluid in fluid communication with a portion of the region of the valve stem that moves through the valve enclosure;

a fluid inlet control valve in fluid communication with a portion of the region of contact between the constituent elements of the valve enclosure;

a second supply of sterilizing fluid in fluid communication with the fluid inlet control valve;

a supply of cooling fluid in fluid communication with the fluid inlet control valve; and wherein the fluid inlet control valve selectively places either the second supply of sterilizing fluid or the supply of cooling fluid in communication with the portion of the region of contact between the constituent elements of the valve enclosure.

2. The valve system of claim 1, and wherein the constituent elements of the valve enclosure include a valve body and a valve bonnet.

3. The valve system of claim 2, and further comprising a valve insert fixed to the valve bonnet between the valve bonnet and the valve body.

4. The valve system of claim 3, and wherein the valve insert includes a non-stick material disposed so that the non-stick material is presented to the interior of the valve enclosure.

5. The valve system of claim 1, and wherein:

the first supply of sterilizing fluid is in fluid communication with the portion of the region of the valve stem that moves through the valve enclosure through a first trace; and the fluid inlet control valve is in fluid communication with the portion of the region of contact between the constituent elements of the valve enclosure through a second trace.

6. The valve system of claim 5, and wherein the second trace includes an annular interior passageway.

7. The valve system of claim 6, and wherein the annular interior passageway is defined at least in part by a valve insert fixed to at least one of the constituent elements of the valve enclosure.

8. The valve system of claim 1, and wherein the first fluid supply and second fluid supply are configured to supply a sterilizing fluid of high temperature steam.

9. The valve system of claim 8, and wherein the cooling fluid is not a sterilizing fluid.

10. The valve system of claim 9, and wherein the cooling fluid is chilled air.

11. The valve system of claim 9, and wherein the cooling fluid is chilled water.

12. The valve system of claim 9, and wherein the cooling fluid is at a temperature of approximately 40° F.

13. The valve system of claim 9, and wherein the cooling fluid is at a temperature of approximately 60° F.

14. The valve system of claim 9, and wherein the cooling fluid is supplied at a positive pressure.

15. A valve system comprising:

a valve body including structure defining an interior, a first product conduit, a second product conduit, and a valve seat;

a valve bonnet in contact with the valve body;

a valve stem with a region movable through the valve bonnet;

a valve member secured to the valve stem, the valve member movable between a closed position in which the valve member contacts the valve seat so as to prevent fluid communication between the first product conduit and the second product conduit, and an open position in which the valve member is away from the valve seat so as to permit fluid communication between the first product conduit and the second product conduit;

a first supply of sterilizing fluid in fluid communication with a portion of the region of the valve stem that moves through the valve bonnet;

a fluid inlet control valve in fluid communication with a portion of the region of contact between the valve bonnet and the valve body;

a second supply of sterilizing fluid in fluid communication with the fluid inlet control valve, a supply of cooling fluid in fluid communication with the fluid inlet control valve; and wherein the fluid inlet control valve selectively places either the second supply of sterilizing fluid or the supply of cooling fluid in fluid communication with the portion of the region of contact between the valve bonnet and the valve body.

16. The valve system of claim 15, and further comprising a valve insert fixed to the valve bonnet between the valve bonnet and the valve body.

17. The valve system of claim 16, and wherein the valve insert includes a non-stick material disposed so that the non-stick material is presented to the interior of the valve body.

18. The valve system of claim 15, and wherein the sterilizing fluids are high temperature steam.

19. The valve system of claim 15, and wherein the cooling fluid is not a sterilizing fluid.

20. The valve system of claim 19, and wherein the cooling fluid is chilled air.

21. The valve system of claim 19, and wherein the cooling fluid is chilled water.

22. The valve system of claim 19, and wherein the cooling fluid is at a temperature of approximately 40° F.

23. The valve system of claim 19, and wherein the cooling fluid is at a temperature of about 60° F.

24. The valve system of claim 19, and wherein the cooling fluid is supplied at a positive pressure.

25. The valve system of claim 15, and:

wherein the first supply of sterilized fluid is in fluid communication with a portion of the region of the valve stem that moves through the valve bonnet through a first trace;

wherein the fluid inlet control valve is in fluid communication with the portion of the region of contact between the valve bonnet and the valve body through a second trace.

26. The valve system of claim 25, and wherein the second trace includes an annular interior passageway.

27. The valve system of claim 26, and wherein the annular interior passageway is defined at least in part by a valve insert fixed to the valve bonnet.

28. A valve system comprising:

a valve enclosure comprising multiple constituent elements;

a valve stem with a region movable through the valve enclosure;

piping configured to supply a first sterilizing fluid to a portion of the region of the valve stem that moves through the valve enclosure;

a fluid inlet control valve;

piping configured to supply a second sterilizing fluid to the fluid inlet control valve;

piping configured to supply a cooling fluid to the fluid inlet control valve;

piping configured to supply fluid from the fluid inlet control valve to a portion of a region of contact between multiple constituent elements of the valve enclosure; and, wherein the fluid inlet control valve is configured to selectively place the either the piping that supplies the second sterilizing fluid or the piping that supplies the cooling fluid in fluid communication with the piping that supplies fluid to the portion of the region of contact between the multiple constituent elements of the valve enclosure.

29. The valve system of claim 28, and wherein the constituent elements of the valve enclosure include a valve body and a valve bonnet.

30. The valve system of claim 29, and further comprising a valve insert fixed inside the valve enclosure between the valve bonnet and the valve body.

31. The valve system of claim 30, and wherein the valve insert includes a non-stick material disposed so that the non-stick material is presented to the interior of the valve enclosure.

32. The valve system of claim 28, and wherein:
the piping configured to supply the first sterilizing fluid is in fluid communication through a first trace with the portion of the region of the valve stem that moves through the valve enclosure; and, the piping configured to supply fluid from the fluid inlet control valve is in fluid communication through a second trace with the portion of the region of contact between said multiple constituent elements of the valve enclosure.

33. The valve system of claim 32, and wherein the second trace includes an annular interior passageway.

34. The valve system of claim 33, and wherein the annular interior passageway is defined at least in part by a valve insert fixed to at least one of the constituent elements of the valve enclosure.

35. The valve system of claim 28, and wherein the sterilizing fluids are high temperature steam.

36. The valve system of claim 28, and wherein the cooling fluid is not a sterilizing fluid.

37. The valve system of claim 36, and wherein the cooling fluid is chilled air.

38. The valve system of claim 36, and wherein the cooling fluid is chilled water.

39. The valve system of claim 36, and wherein the cooling fluid is at a temperature of approximately 40° F.

40. The valve system of claim 36, and wherein the cooling fluid is at a temperature of approximately 60° F.

41. The valve system of claim 36, and wherein the piping configured to supply the cooling fluid is configured to supply a fluid under positive pressure.

42. A dual trace valve system, the valve system comprising:
a valve enclosure defining an interior and comprising a plurality of constituent elements;
a valve stem movable through the valve enclosure;
a fluid inlet control valve in fluid communication with a portion of a region of contact between multiple constituent elements of the valve enclosure;
a primary supply of sterilizing fluid in fluid communication with:
a) at least a portion of a region of the valve stem that moves through the valve enclosure; and
b) the fluid inlet control valve;

a secondary fluid supply of cooling fluid in fluid communication with the fluid inlet control valve;
wherein said primary and secondary fluid supplies are configured to supply different fluids; and
wherein the fluid inlet control valve selectively places either the primary or the secondary fluid supply in fluid communication with the region of contact between the multiple constituent elements of the valve enclosure.

43. The valve system of claim 42, and wherein the constituent elements of the valve enclosure include a valve body and a valve bonnet.

44. The valve system of claim 43, and further comprising a valve insert fixed to the valve bonnet between the valve body and the valve bonnet.

45. The valve system of claim 44, and wherein the valve insert includes a non-stick material disposed so that the non-stick material is presented to the interior of the valve enclosure.

46. The valve system of claim 42, and wherein:
the secondary fluid supply of cooling fluid is configured to supply a fluid that is not a sterilizing fluid.

47. The valve system of claim 46, and wherein the sterilizing fluids are high temperature steam.

48. The valve system of claim 42, and wherein the cooling fluid is chilled air.

49. The valve system of claim 42, and wherein the cooling fluid is chilled water.

50. The valve system of claim 42, and wherein the cooling fluid is at a temperature of approximately 40° F.

51. The valve system of claim 42, and wherein the cooling fluid is at a temperature of approximately 60° F.

52. The valve system of claim 46, and wherein the cooling fluid is a fluid at a positive pressure.

53. A method for sterilizing a valve system for controlling the flow of a food product through a piping system, wherein the method comprises:
initiating flow of a first sterilizing fluid through a first region inside a valve;
initiating flow of a second sterilizing fluid through a second region inside the valve;
halting flow of the second sterilizing fluid through the second region inside the valve;
initiating flow of a cooling fluid through the second region inside the valve;
operating the valve to control the flow of the food product through the piping system while continuing the flow of the first sterilizing fluid through the first region inside the valve and the flow of the cooling fluid through the second region inside the valve.

54. The method of claim 53, and wherein the first and second sterilizing fluids are the same fluid.

55. The method of claim 53, and wherein at least one of the first and second sterilizing fluids are high temperature steam.

56. The method of claim 53, and wherein the non-sterilizing cooling fluid is chilled air.

57. The method of claim 53, and wherein the non-sterilizing cooling fluid is chilled water.

* * * * *